United States Patent
Browne

(10) Patent No.: US 9,651,786 B1
(45) Date of Patent: May 16, 2017

(54) SYSTEMS AND METHODS FOR AUGMENTED REALITY DEVICES WITH LIGHT SECURITY

(71) Applicant: SA Photonics, Inc., Los Gatos, CA (US)

(72) Inventor: Michael P. Browne, San Mateo, CA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 15/146,789

(22) Filed: May 4, 2016

Related U.S. Application Data

(60) Provisional application No. 62/157,254, filed on May 5, 2015, provisional application No. 62/221,985, filed on Sep. 22, 2015.

(51) Int. Cl.
- *G02B 27/14* (2006.01)
- *G02B 27/01* (2006.01)
- *G02B 26/04* (2006.01)
- *G06T 19/00* (2011.01)
- *G09G 3/02* (2006.01)

(52) U.S. Cl.
CPC ......... *G02B 27/0172* (2013.01); *G02B 26/04* (2013.01); *G06T 19/006* (2013.01); *G09G 3/02* (2013.01); *G02B 2027/0118* (2013.01); *G09G 2320/0626* (2013.01); *G09G 2360/145* (2013.01)

(58) Field of Classification Search
CPC ............... G02B 27/0172; G02B 26/04; G02B 2027/0118; G02B 3/0087; G02B 27/0101; G02B 2027/0127; G02B 23/08; G06T 19/006; G09G 3/02; G09G 2320/0626; G09G 2360/145; G09B 9/245

USPC ......... 359/13, 229, 230, 578–584, 630–633; 356/4.01, 251; 348/56, E13.059; 345/419

See application file for complete search history.

(56) References Cited

U.S. PATENT DOCUMENTS

| | | |
|---|---|---|
| 3,410,629 A | 11/1968 | Carpenter et al. |
| 4,698,857 A | 10/1987 | Kastendieck et al. |

(Continued)

FOREIGN PATENT DOCUMENTS

JP 2010145674 A * 7/2010

OTHER PUBLICATIONS

Moore, S.A., "Anamorphic Eyepiece for Increased Field of View", International Optical Design Conference (IODC), Jun. 13, 2010, 5 pages.

(Continued)

*Primary Examiner* — Ricky Mack
*Assistant Examiner* — Mustak Choudhury
(74) *Attorney, Agent, or Firm* — Knobbe Martens Olson & Bear LLP

(57) ABSTRACT

Apparatus and method of reducing light leakage from display devices are described. An embodiment of reducing light leakage from display devices includes providing an optical shutter that is configured to block light from a display device from being emitted into the ambient environment when the display device is in a bright state and configured to display visual information to the user. The optical shutter can be configured to transmit light from the ambient environment to the user when the display device is not displaying visual information.

30 Claims, 2 Drawing Sheets

```
                              ┌─400
                              ┌─405
  Providing a voltage (V_off) that switches off the display
  device and providing a voltage (V_transmit) that switches the
      optical shutter to a state of increased transmittance
                              │
                              ▼  ┌─410
  Providing a voltage (V_on) that switches on the display
  device and providing a voltage (V_block) that switches the
      optical shutter to a state of decreased transmittance
```

(56) References Cited

U.S. PATENT DOCUMENTS

| | | |
|---|---|---|
| 5,473,365 A | 12/1995 | Okamura |
| 5,572,343 A | 11/1996 | Okamura et al. |
| 5,726,807 A | 3/1998 | Nakaoka et al. |
| 6,075,644 A | 6/2000 | Filipovich |
| 6,201,641 B1 | 3/2001 | Filipovich |
| 6,407,724 B2 | 6/2002 | Waldern et al. |
| 6,462,894 B1 | 10/2002 | Moody |
| 6,560,029 B1 | 5/2003 | Dobbie et al. |
| 6,653,989 B2 | 11/2003 | Nakanishi |
| 6,757,008 B1 | 6/2004 | Smith |
| 7,072,107 B2 | 7/2006 | Filipovich et al. |
| 7,158,296 B1 | 1/2007 | Schwartz, II et al. |
| 7,289,272 B2 | 10/2007 | Bowron et al. |
| 7,307,793 B2 | 12/2007 | Ottney et al. |
| 7,381,952 B2 | 6/2008 | Teich et al. |
| 7,806,533 B2 | 10/2010 | Boute et al. |
| 8,736,967 B1 | 5/2014 | Browne et al. |
| 8,817,196 B2 | 8/2014 | De La Tocnaye et al. |
| 2003/0129567 A1* | 7/2003 | Cabato ............... G02B 23/08 434/38 |
| 2003/0231804 A1 | 12/2003 | Bacarella et al. |
| 2004/0227703 A1 | 11/2004 | Lamvik et al. |
| 2005/0046702 A1 | 3/2005 | Katayama et al. |
| 2008/0136923 A1 | 6/2008 | Inbar et al. |
| 2008/0170119 A1 | 7/2008 | McCann |
| 2008/0309774 A1 | 12/2008 | Goh et al. |
| 2009/0051760 A1 | 2/2009 | Ottney |
| 2009/0251680 A1 | 10/2009 | Farsaie |
| 2010/0128138 A1 | 5/2010 | Nitta et al. |
| 2012/0002064 A9 | 1/2012 | Filipovich et al. |
| 2012/0119978 A1 | 5/2012 | Border et al. |
| 2012/0182326 A1 | 7/2012 | Moore |
| 2012/0257005 A1 | 10/2012 | Browne |
| 2013/0234935 A1 | 9/2013 | Griffith |

OTHER PUBLICATIONS

Wilburn, "High Performance Imaging Using Arrays of Inexpensive Cameras", A Dissertation Submitted to the Department of Electrical Engineering and The Committee on Graduate Studies of Stanford University in Partial Fulfillment of the Requriements for the Degree of Doctor of Philosophy, 2004.

* cited by examiner

SYSTEMS AND METHODS FOR AUGMENTED REALITY DEVICES WITH LIGHT SECURITY

CROSS-REFERENCE TO RELATED APPLICATIONS

This application claims the benefit of priority under 35 U.S.C. §119(e) of U.S. Provisional Patent Application No. 62/157,254, filed on May 5, 2015 and titled "AUGMENTED REALITY HMD PROVIDING INCREASED LIGHT SECURITY;" and of U.S. Provisional Patent Application No. 62/221,985, filed on Sep. 22, 2015 and titled "AUGMENTED REALITY HMD PROVIDING INCREASED LIGHT SECURITY." Each of the above-identified applications is hereby incorporated by reference herein in its entirety for all purposes.

BACKGROUND

Field

This disclosure relates to methods and systems for providing displays with increased light security such that light from the displays is viewed by users viewing the displays and leakage of light from the displays into the ambient environment is reduced.

Description of the Related Technology

Advances in display technologies and mobile computing systems have facilitated the development of augmented reality (AR) systems that can present a user with a view of the real physical world that surrounds the user augmented with computer-generated information such as text, data, graphics, images, video, etc. Example of such information may include, maps, GPS data, photos. This supplemental content may be presented in a manner wherein the user perceives the computer generated information to be superimposed on or adjacent to the view of the real-world objects in front and/or surrounding the user. Presentation of this additional content can be provided in real-time.

SUMMARY

An innovative aspect of the subject matter disclosed herein is implemented in an optical system comprising a display device; a beam combiner; and a shutter. The display device has a first bright display state when the display device emits light and a second dark display state when the display device emits a reduced amount of light. The shutter has a first blocking shutter state in which the shutter blocks light passing through the beam combiner and incident on the shutter and a second transmissive shutter state in which the shutter transmits light so that light can pass through the beam combiner. The shutter is configured to be controlled by a control system, such that the shutter is in the first blocking shutter state when the display device emits light and the shutter is in the second transmissive shutter state when the amount of light emitted from the display device is reduced.

In various embodiments of the optical system, the display device can comprise a transmissive display, a reflective display or an emissive display. In various embodiments of the optical system, the display device can include a source of front illumination for illuminating a reflective display. The beam combiner can be configured to redirect light emitted from the display device towards a viewer disposed to view a scene through the optical system. The beam combiner can be configured to transmit ambient light from the scene incident on the optical system through the shutter to the viewer. The control system can be configured to control the shutter by providing an electrical signal having a voltage level $V_{blocking}$ that causes the shutter to be in the first blocking shutter state and a voltage level $V_{transmit}$ that causes the shutter to be in the second transmissive shutter state. A duration of time when the electrical signal has the voltage level $V_{transmit}$ can be greater than a duration of time when the electrical signal has the voltage level $V_{blocking}$. The control system can be configured to synchronize transitioning the shutter between the first blocking shutter state and the second transmissive shutter state with transitioning the display device between the first bright display state and the second dark display state. The control system can be configured to transition the shutter between the first blocking shutter state and the second transmissive shutter state at a rate faster than the unaided human eye can detect. The control system can be configured to transition the shutter between the first blocking shutter state and the second transmissive shutter state at a rate between about 1 microsecond and about 100 milliseconds. Various embodiments of the optical system can be included in a head mounted display, a tank sight and/or a gun sight.

The shutter can be substantially opaque such that ambient light is not transmitted through the shutter in the first blocking shutter state. The shutter can be substantially transmissive such that ambient light is transmitted through the shutter in the second transmissive shutter state. The shutter can be configured to block greater than 50% of the light emitted from or reflected by the display that passes through the beam combiner or is incident on the shutter in the first blocking state. In various embodiments, the shutter can be configured to block greater than 40%, greater than 60%, greater than 70%, greater than 80% or greater than 90% of the light emitted from or reflected by the display that passes through the beam combiner or is incident on the shutter in the first blocking state.

In the first blocking state, the shutter can be configured to block less than 100%, less than 98%, or less than 95% of the light emitted from or reflected by the display that passes through the beam combiner or is incident on the shutter. In various embodiments of the optical system, the beam combiner can comprise a waveguide. In various embodiments of the optical system, the shutter can comprise an opto-mechanical or an electro-optic device.

An innovative aspect of the subject matter disclosed herein is implemented in a method of reducing light leakage from a display device having a first bright display state when the display device emits light and a second dark display state when the display device emits a reduced amount of light. The method comprises providing a shutter having a first blocking shutter state in which the shutter has a reduced transmissivity when the display device is in the first bright display state and light from the display device is incident on the shutter and a second transmissive shutter state in which the shutter has an increased transmissivity when the display device is in the second dark display state.

Various embodiments of the method can further comprise providing an electrical signal having a voltage level $V_{blocking}$ that causes the shutter to be in the first blocking shutter state and a voltage level $V_{transmit}$ that causes the shutter to be in the second transmissive shutter state. Various embodiments of the method can further comprise synchronizing transitioning the shutter between the first blocking shutter state and the second transmissive shutter state with transitioning the display device between the first bright display state and the second dark display state. The shutter can be transitioned between the first blocking shutter state and the second transmissive shutter state at a rate faster than the unaided human eye can detect. The shutter can be transitioned between the first blocking shutter state and the second transmissive shutter state at a rate between about 1 microsecond and about 100 milliseconds.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Example implementations disclosed herein are illustrated in the accompanying schematic drawings, which are for illustrative purposes only.

DETAILED DESCRIPTION OF EMBODIMENTS

Figure 1:
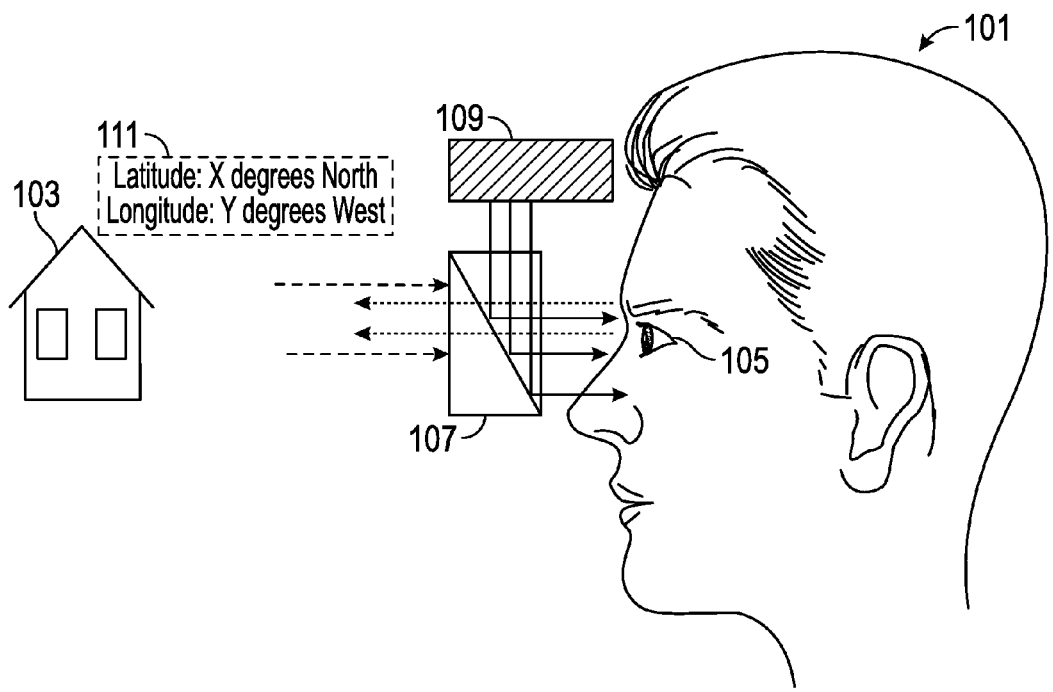
FIG. 1 is a schematic diagram of an augmented reality (AR) head mounted display (HMD) device that includes a display device and a beam combiner.

AR systems and devices provide the ability to overlay information on top of the real world seen by the user's natural vision. FIG. 1 depicts a generic AR head mounted display (HMD) device that can be worn on a user's head (e.g., on a user's face). The AR-HMD device includes one or more display devices 109 integrated with imaging optics, such as, for example, focusing and/or collimating lenses or elements that direct light from the one or more display devices 109 towards one or more optics disposed in front of one or both of the users' eyes 105. The optics disposed in front of one or both of the users' eyes 105 can include a beam combiner 107, which can direct light from the one or more display devices towards the user's eyes 105 as well as transmit light from objects in the real-world. The beam combiner 107, in some implementations, can be configured to provide collimation and may have optical power. Such AR-HMD devices that transmit light from the real-world objects towards the user's eyes can be referred to as see-through AR-HMD devices. The optics disposed in front of one or both of the users' eyes 105 can be supported by a frame that can be worn on or around the user's head (e.g., face). In various embodiments, the frame supporting the optics (e.g. beam combiner) disposed in front of one or both of the users' eyes 105 can include straps or ear stems. The one or more display devices 109 can be configured to receive visual information (e.g., text, graphics, video, etc.) that can modify or augment the physical real-world perceived by the user 101. As discussed above, examples of such information may include, maps, GPS data, photos. Visual information can be generated by an electronic hardware processing system (e.g., a computing device or electronics) that is transmitted to the AR-HMD device, for example, using wired or wireless technologies. In various embodiments, the electronic hardware processing system or processing electronics can be integrated with the AR-HMD device. In some embodiments, the electronic hardware processing system or processing electronics can be located remotely from the AR-HMD device.

In operation, ambient light from the real-world surrounding the user 101 is transmitted through the beam combiner 107 and directed towards the user's eyes 105 thereby allowing the user 101 to see objects in the real-world. The visual information (e.g., text, video, data, graphics, etc.) generated by the electronic hardware processing system is displayed on the one or more display devices 109. Light from the display device 109 is reflected by the beam combiner 107 towards the user's eyes 105. Accordingly, the user 101 perceives the generated visual information simultaneously with the objects in the real-world as though the generated visual information is overlaid on objects in the real-world or disposed adjacent to these real-world object and is a part of the real-world. For example, referring to FIG. 1, the user 101 perceives the location information 111 which is visual information generated by the electronic hardware processing system or processing electronics superimposed on or disposed adjacent to a house 103 in the real-world scene. In this manner, the user's perception of reality is modified or augmented.

In various embodiments of AR systems, the beam combiner 107 can include at least one of partially metallized mirrors, dielectric coatings, dichroic coatings and/or interference coatings disposed on a transmissive material, partially transmissive mirrors, waveguide devices or polarization beam combiners. The display device 109 can comprise backlit liquid crystal display (LCD) technology such as a reflective or transmissive LCD display, light emitting diode (LED) based display devices, organic LED (OLED) display devices or other types of displays. Accordingly, in various embodiments, the display device 109 can comprise a transmissive display, a reflective display or an emissive display.

AR-HMD devices can provide many benefits in situational awareness which involves obtaining information in real-time about events occurring in the surrounding environment and using the obtained information to control one's own actions to achieve a desired objective immediately and in the near future. Accordingly, AR-HMD devices can find many uses in defense, homeland security, emergency management and/or rescue and recovery operations. The light emitted from the one or more display devices 109 that includes the generated virtual visual information can leak out of the AR-HMD device worn by the user 101 or be scattered from the user's eyes 105 and/or other facial structures and can be seen by people or detected by devices in the surrounding environment. This stray light can be disadvantageous when the AR-HMD device is used for nighttime military operations as emitting noticeable amounts of light from the user 101 that can be seen or detected can be counterproductive to clandestine operations. Accordingly, it can be advantageous to reduce or prevent leakage of the light emitted from the display device into the surrounding environment.

AR-HMD Device with Increased Light Security

Figure 2:
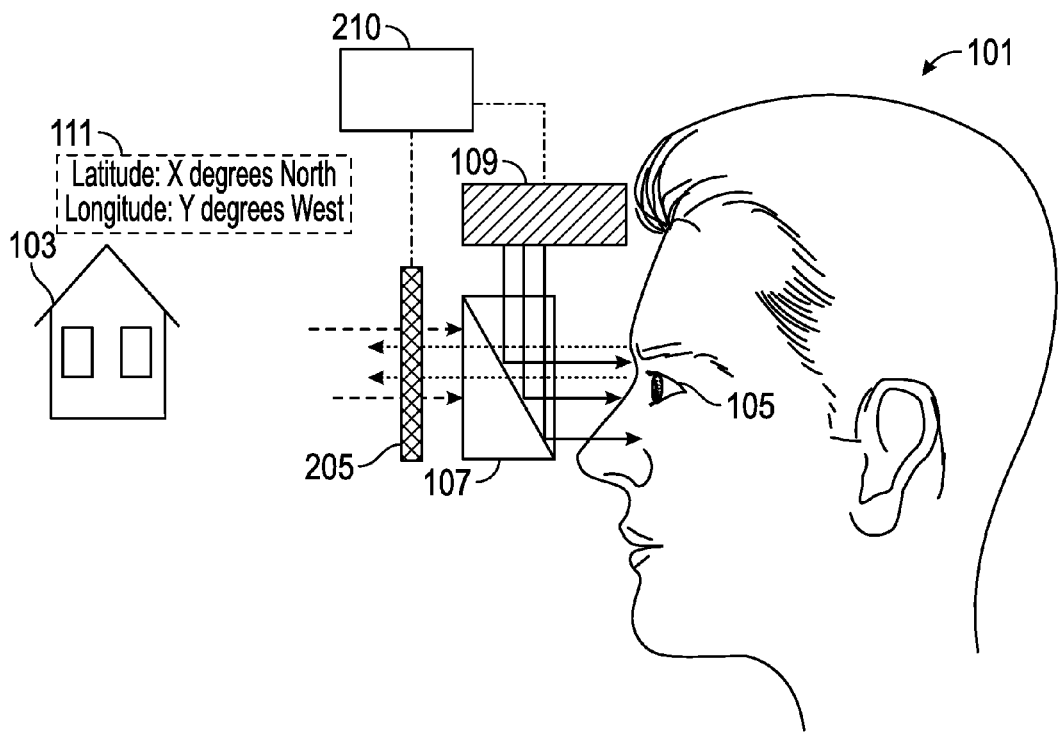
FIG. 2 schematically illustrates an embodiment of an AR-HMD device including a shutter that reduces leakage of light from the display device.

FIG. 2 schematically depicts an embodiment of an AR-HMD device that is configured to reduce leakage of light from the display device. The AR-HMD device comprises an optical shutter 205 that is controlled by signals from an electronic hardware control system 210 or control electronics. The optical shutter 205 is disposed between the beam combiner 107 and the real world to reduce leakage of stray light from the one or more display devices 109. Accordingly, the optical shutter 205 can be disposed at the output of the optic of the AR-HMD device. The optical shutter 205 can be configured to transition between a first blocking state in which the optical shutter 205 can substantially block light from the one or more display devices 109 that is forward directed towards the environment after scattering from the user's eye 105 and/or facial structures of the user 101 and a second transmissive state in which the optical shutter 205 can allow ambient light from the environment to be transmitted to the user's eye through the beam combiner 107. The optical shutter 205 can be referred to as being closed when configured to be in the first state and referred to as being open when configured to be in the second state. Light leakage from the one or more display devices 109 can be eliminated or substantially reduced when the optical shutter 205 is closed and the AR-HMD device is provided with a housing including eyecups and/or baffles or some other configuration for eliminating or preventing light from leaking around the optical shutter 205. Accordingly, providing the optical shutter can advantageously increase light security of AR-HMD devices. The optical shutter 205 can allow the user 101 to see the ambient environment in the forward direction when the optical shutter 205 is configured to be in the second state, yet block stray or scattered light from the display when in the first state.

As discussed above, the AR-HMD devices can be configured such that the visual information generated by the electronic hardware processing system can be overlaid on and/or presented adjacent to the view of objects in the real-world environment so as to modify and/or augment the view of the real-world environment in real-time. Accordingly, the optical shutter 205 can be transitioned between the first and the second states at rates such that the user 101 can perceive the virtual visual information along with the real-world objects without experiencing a time lag. For example, the optical shutter 205 can be transitioned between the first and the second states at a rate faster than the unaided human eye can detect. For example, the optical shutter 205 can be transitioned between the first and the second states at time intervals that are comparable to or less than the persistence of vision—which is approximately 1/16 of a second such that the real-world objects and the virtual visual information are blended together. For example, the optical shutter 205 can be transitioned between the first and the second states at a time intervals between about 1 microsecond and about 100 milliseconds; between about 10 microseconds and about 70 milliseconds; between about 50 microseconds and about 65 milliseconds; between about 75 microseconds and about 50 milliseconds; between about 100 microseconds and about 40 milliseconds; between about 200 microseconds and about 30 milliseconds; between about 300 microseconds and about 20 milliseconds; between about 500 microseconds and about 10 milliseconds; between about 1 millisecond and about 5 milliseconds; or any values in these ranges/sub-ranges.

When the optical shutter 205 is transitioned between the first and the second states at time intervals that are comparable to or less than the persistence of vision in the period during which the optical shutter 205 is referred to as being open, ambient light from objects in the surrounding environment is transmitted through the beam combiner 107 towards the user's eyes 105 and in the period during which the optical shutter 205 is referred to as being closed, light from the one or more display devices 109 modulated by the virtual visual information that modifies and/or augments objects in the real-world environment is reflected by the beam combiner 107 towards the user's eyes 105. The objects in the real-world and the virtual visual information are perceived simultaneously by the user 101 due to persistence of vision. Advantageously, in the period during which the optical shutter 205 is considered to be closed, most or all of the light from the one or more display devices 109 is prevented from being directed out of the AR-HMD device into the surrounding environment thus increasing the light security of the AR-HMD device. The optical shutter can be considered to be opaque when it is configured to be in the first blocking state (or closed state), since the optical shutter 205 prevents light from entering or exiting the AR-HMD device when configured to be in the first blocking state. The optical shutter can be considered to be transmissive when it is configured to be in the second transmissive state (or open state), since the optical shutter 205 allows light to enter the AR-HMD device when configured to be in the second transmissive state.

In various embodiments, the optical shutter 205 can comprise an opto-mechanical or electro-optical device that can be transitioned between the first state and second state by application of an electrical signal (e.g., an electrical voltage, an electrical charge, etc.). In some embodiments, the optical shutter 205 can comprise a liquid crystal modulator that can be transitioned between the first state and second state by application of an electrical signal (e.g., an electrical voltage). In some embodiments, the optical shutter 205 can comprise a Twisted Nematic (TN) liquid crystal element and/or a ferroelectric liquid crystal element. In some embodiments, the optical shutter 205 can include an electrochromic device. In other embodiments, the optical shutter 205 can include other materials and/or devices that are known in the art. The optical shutter 205 can comprise absorbers to further decrease leakage of forward directed light from the one or more display devices 109 in some embodiments.

As discussed above, the transitioning of the optical shutter 205 between the first blocking state and the second transmissive state can be controlled by signals from the electronic hardware control system or control electronics 210. For example, the electronic hardware control system 210 can be configured to provide electromagnetic signals (e.g., electrical current, electrical voltage, electrical charge, etc.) to the optical shutter 205 to switch the optical shutter 205 between the first blocking state and the second transmissive state. The optical shutter can be opened and closed at fast rates (e.g., at a rate between about 1 microsecond and about 100 milliseconds). The electronic hardware control system 210 can include components (e.g., capacitors, inductors, transistors, diodes, resistors, etc.) with fast frequency response that can generate signals with fast rise and fall times. For example, the components of the electronic hardware control system 210 can have time constants that can generate signals with rise and fall times of less than about 1 microsecond-10 milliseconds or less than about 1 microsecond-100 milliseconds. The electronic hardware control system 210 can be configured to provide the signals that maintains the optical shutter 205 in the first state for an interval of time $t_{block}$ and then switch the optical shutter 205 from the first state to the second state and maintain the optical shutter 205 in the second state for an interval of time $t_{transmit}$ and/or vice-versa. The interval of time $t_{block}$ for which the optical shutter 205 is maintained in the first state and/or the interval of time $t_{transmit}$ and/or for which the optical shutter 205 is maintained in the second state can be less than or equal to persistence of vision. For example, in various embodiments, the interval of time $t_{block}$ for which the optical shutter 205 is maintained in the first state and/or the interval of time $t_{transmit}$ and/or for which the optical shutter 205 is maintained in the second state can be less than or equal to about 1 microsecond and about 100 milliseconds; about 10 microseconds and about 70 milliseconds; about 50 microseconds and about 65 milliseconds; about 75 microseconds and about 50 milliseconds; about 100 microseconds and about 40 milliseconds; about 200 microseconds and about 30 milliseconds; about 300 microseconds and about 20 milliseconds; about 500 microseconds and about 10 milliseconds; about 1 millisecond and about 5 milliseconds; or any values in these ranges/sub-ranges.

Figure 3A:
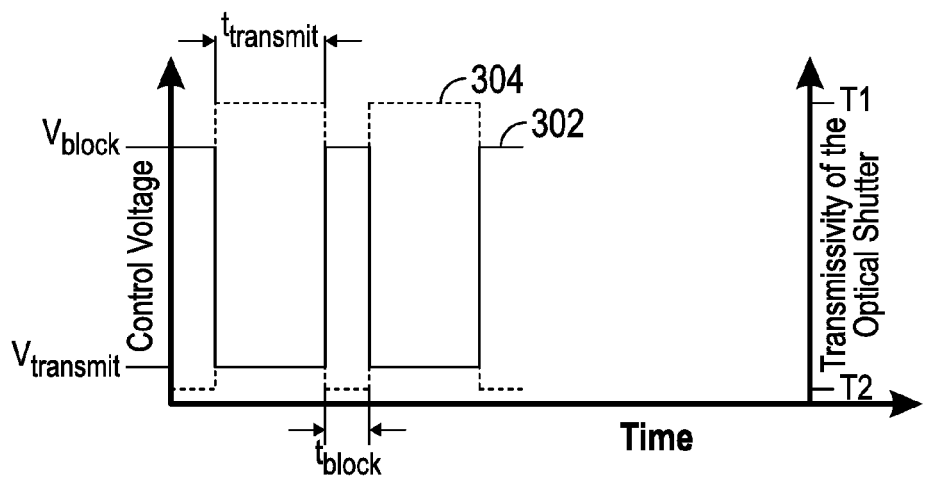
FIG. 3A illustrates the variation of an electrical control signal that can switch the shutter between a blocking state and a transmit state thereby varying the transmissivity of the AR system between a first transmittance and a second transmittance.

FIG. 3A illustrates a graph 302 that shows the variation in the control voltage with respect to time provided by an embodiment of the electronic hardware control system 210 to an embodiment of an optical shutter 205 and the corresponding graph 304 that shows the variation in the transmissivity of the optical shutter 205. The embodiment of the electronic hardware control system 210 can be configured to provide a blocking voltage $V_{block}$ and a transmit voltage $V_{transmit}$. The blocking voltage $V_{block}$ can be lower than the transmit voltage $V_{transmit}$ as illustrated in FIG. 3A. However, in other embodiments, the blocking voltage $V_{block}$ can be greater than the transmit voltage $V_{transmit}$. The blocking voltage $V_{block}$ and/or transmit voltage $V_{transmit}$ can be positive or negative. The blocking voltage $V_{block}$ and the transmit voltage $V_{transmit}$ can have a magnitude in the range between about 1.0 mV and about 10V. Other values, however, are also possible. The optical shutter 205 can have a first transmissivity $T_1$ when the blocking voltage $V_{block}$ is provided and have a second transmissivity $T_2$ when the transmit voltage $V_{transmit}$ is provided. The first transmissivity $T_1$ can be between 0 and about 30%. The second transmissivity $T_2$ can be between about 50% and about 100% in some embodiments. In some embodiments, the second transmissivity $T_2$ can be between about 40% and about 100%

The electronic hardware control system 210 can be configured to provide the blocking voltage $V_{block}$ for a first duration of time $t_{block}$ and the transmit voltage $V_{transmit}$ for a second duration of time $t_{transmit}$. The first and/or the second duration of time $t_{block}$ and $t_{transmit}$ can be between about 1 microsecond and about 100 milliseconds. As discussed above, in the first duration of time $t_{block}$ the optical shutter 205 can block greater than 70% of the light emitted from or reflected by the one or more display devices 109 that passes through the beam combiner 107 or is incident on the optical shutter 205. In some embodiments, the optical shutter 205 may block greater than 80% of the light emitted from or reflected by the one or more display devices 109 that passes through the beam combiner 107 or is incident on the optical shutter 205. The optical shutter 205 may in some implementations block greater than 90% of the light emitted from or reflected by the one or more display devices 109 that passes through the beam combiner 107 or is incident on the optical shutter 105. In some implementations, the optical shutter 105 may block 100% of the light emitted from or reflected by the one or more display devices 109 that passes through the beam combiner 107 or is incident on the optical shutter 205 but in many cases, leakage may nevertheless exist. For example, the shutter may block less than 100% of the light emitted from or reflected by the one or more display devices 109 that passes through the beam combiner 107 or is incident on the optical shutter 205. In some implementations, the optical shutter 205 may block less than 98% of the light emitted from or reflected by the one or more display devices 109 that passes through the beam combiner 107 or is incident on the optical shutter 205. Or the optical shutter 205 may block less than 95% of the light emitted from or reflected by the one or more display devices 109 that passes through the beam combiner 107 or is incident on the optical shutter 205. Any ranges between the values set forth herein are possible.

The electronic hardware control system or control electronics 210 can be configured to switch the transmissivity of the optical shutter 205 between the first and the second transmissivities $T_1$ and $T_2$ periodically as shown in FIG. 3A, however in other implementations, the switching between the transmissivity of the optical shutter 205 between the first and second transmissivities $T_1$ and $T_2$ need not be periodic. As shown in FIG. 3A, the duty cycle of the electrical signal provided by the electronic hardware control system 210 need not be 1:1. Rather, as shown in FIG. 3A, the optical shutter 205 may be configured to be maintained at the second transmissivity $T_2$ for a longer duration of time $t_{transmit}$ than the duration of time $t_{block}$ for which the optical shutter 205 is maintained at the first transmissivity $T_1$. Although, for the embodiment illustrated in FIG. 3A, $t_{transmit}$ is greater than $t_{block}$, in other embodiments, $t_{transmit}$ can be less than or equal to $t_{block}$. The electronic hardware control system 210 may be configured to synchronize the variation in the transmissivity of the optical shutter 205 with the one or more display devices 109. For example, the electronic hardware control system 210 can be configured to maintain the transmissivity of the optical shutter 205 at the second transmissivity $T_2$ (e.g., in the open state) when the one or more display devices 109 are off and maintain the transmissivity of the optical shutter 205 at the first transmissivity $T_1$ (e.g., in the closed state) when the one or more display devices 109 are on. Accordingly, the optical shutter 205 has increased transmissivity (or is open) for the duration of time when the one or more display devices 109 are off (or in a dark or low light output state) and the optical shutter 205 has decreased transmissivity (or is closed) for the duration of time when the one or more display devices 109 are on (or in a bright or high light output state) such that most of the light from the one or more display devices 109 that would otherwise be reach an onlooker, for example, in front of the user 101 when light is emanating from the one or more display devices 109 is blocked. Accordingly, the AR-HMD device discussed above provides a see-through system with increased light security.

Figure 3B:
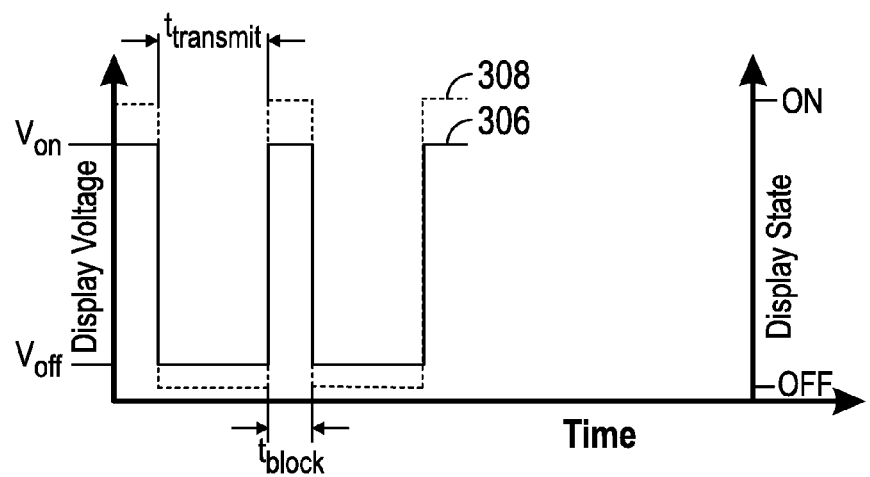
FIG. 3B illustrates the corresponding display states.

FIG. 3B shows a graph 308 that shows the variation in the state of the one or more display devices 109 corresponding to the variation in the transmissivity of optical shutter 205. As noted from graph 308, the one or more display devices 109 are turned on (or in a bright or high light output state) in the time interval $t_{block}$ when the optical shutter 205 has reduced transmissivity $T_1$ and turned off (or in a dark or low light output state) in the time interval $t_{transmit}$ when the optical shutter 205 has increased transmissivity $T_2$. The electronic hardware control system 210 can be configured to turn the one or more display devices 109 on or off by providing a display voltage equivalent to $V_{on}$ when the control voltage provided to the optical shutter 205 is equal to $V_{block}$ and providing a display voltage equivalent to $V_{off}$ when the control voltage provided to the optical shutter is equal to $V_{transmit}$. Other configurations or arrangement for controlling the display are also possible. The graph 306 shows the variation in the display voltage provided by the electronic hardware control system 210 with time. Once again, however, the display may be configured differently.

Figure 4:
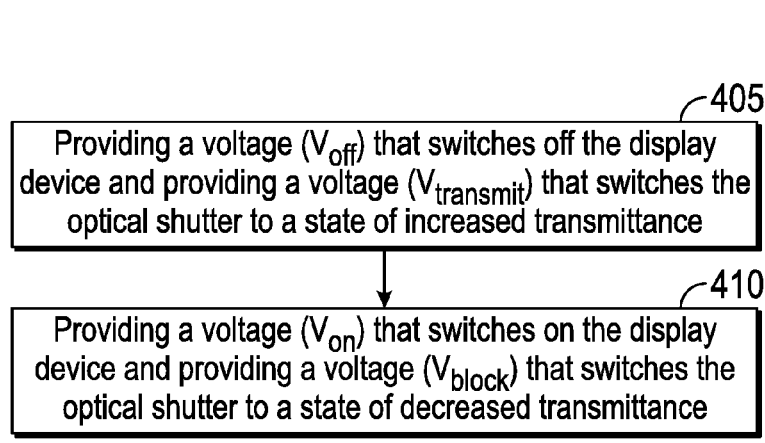
FIG. 4 is a flowchart depicting a method of controlling the transmissivity of an embodiment of an AR-HMD device.

FIG. 4 is a flowchart depicting a method 400 of controlling the transmissivity of an embodiment of an AR-HMD device comprising an optical shutter, such as, for example, the optical shutter 205 depicted in FIG. 2. The method 400 may be implemented by an electronic processor (e.g., electronic processing systems or processing electronics of the electronic hardware control system or control electronics 210). The method 400 includes providing a voltage that switches off the display device and providing a voltage that switches the optical shutter to a state of increased transmittance as shown in block 405 to allow ambient light to enter the AR-HMD device. For example, the electronic processor can be configured to provide an electrical voltage equal to $V_{off}$ that switches off (or to a dark or low light output state) the one or more display devices and provide a voltage $V_{transmit}$ that transitions the shutter to a state of increased transmittance (e.g., having a transmittance T2) such that the optical shutter is in an open or transmissive state. The method 400 further include providing a voltage that switches on (or to a bright or high light output state) the display device and providing a voltage that switches the optical shutter to a state of decreased transmittance as shown in block 410 to block or prevent leakage of light from the display device. For example, the electronic processor can be configured to provide an electrical voltage equal to $V_{block}$ that transitions the shutter to a state of decreased transmittance (e.g., having a transmittance $T_1$) such that the optical shutter is in a blocked or closed state. In this manner, the transmissivity of the optical shutter can be synchronized with the display device.

Although, various embodiments of the optical systems and methods are described with reference to an augmented reality head mounted display device, they can be used in other application as well including but not limited to a tank sight or a gun sight. Various embodiments of the optical systems and methods described herein can be used for defense applications and/or homeland security applications.

Each of the processes, methods, and algorithms described herein and/or depicted in the attached figures may be embodied in, and fully or partially automated by, code modules executed by one or more physical computing systems, hardware computer processors, application-specific circuitry, field programmable gate arrays (FPGAs) and/or electronic hardware configured to execute specific and particular computer instructions. For example, computing systems can include general purpose computers programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time, such as for example of other order of a few hundred microseconds to a few milliseconds.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An optical system comprising:
    a display device having a first bright display state when the display device emits light and a second dark display state when the display device emits a reduced amount of light;
    a beam combiner; and
    a shutter having a first blocking shutter state in which the shutter blocks light passing through the beam combiner and incident on the shutter and a second transmissive shutter state in which the shutter transmits light so that light can pass through the beam combiner, the shutter configured to be controlled by a control system, such that the shutter is in the first blocking shutter state when the display device emits light and the shutter is in the second transmissive shutter state when the amount of light emitted from the display device is reduced, wherein the control system is configured to transition the shutter between the first blocking shutter state and the second transmissive shutter state at a rate between about 1 microsecond and about 100 milliseconds which is less than or equal to the persistence of vision such that an unaided human eye can simultaneously perceive objects in a real-world environment and visual information displayed by the display device.

2. The optical system of claim 1, wherein the display device comprises a transmissive display.

3. The optical system of claim 1, wherein the display device comprises a reflective display.

4. The optical system of claim 3, wherein the display device includes a source of front illumination for illuminating the reflective display.

5. The optical system of claim 1, wherein the display device comprises an emissive display.

6. The optical system of claim 1, wherein the beam combiner is configured to redirect light emitted from the display device towards a viewer disposed to view a scene through the optical system.

7. The optical system of claim 6, wherein the beam combiner is configured to transmit ambient light from the scene incident on the optical system through the shutter to the viewer.

8. The optical system of claim 1, wherein the control system is configured to control the shutter by providing an electrical signal having a voltage level $V_{blocking}$ that causes the shutter to be in the first blocking shutter state and a voltage level $V_{transmit}$ that causes the shutter to be in the second transmissive shutter state.

9. The optical system of claim 8, wherein a duration of time when the electrical signal has the voltage level $V_{transmit}$ is greater than a duration of time when the electrical signal has the voltage level $V_{blocking}$.

10. The optical system of claim 1, wherein the control system is configured to synchronize transitioning the shutter between the first blocking shutter state and the second transmissive shutter state with transitioning the display device between the first bright display state and the second dark display state.

11. The optical system of claim 1, included in a head mounted display.

12. The optical system of claim 1, included in a tank sight.

13. The optical system of claim 1, included in a gun sight.

14. The optical system of claim 1, wherein in the first blocking shutter state the shutter is substantially opaque such that ambient light is not transmitted through the shutter and in the second transmissive shutter state the shutter is substantially transmissive such that ambient light is transmitted through the shutter.

15. The optical system of claim 14, wherein in the first blocking shutter state, the shutter has a transmissivity less than or equal to 30%.

16. The optical system of claim 1, wherein in the first blocking state, the shutter can block greater than 50% of the light emitted from or reflected by the display that passes through the beam combiner or is incident on the shutter.

17. The optical system of claim 16, wherein in the first blocking state, the shutter can block greater than 60% of the light emitted from or reflected by the display that passes through the beam combiner or is incident on the shutter.

18. The optical system of claim 17, wherein in the first blocking state, the shutter can block greater than 70% of the light emitted from or reflected by the display that passes through the beam combiner or is incident on the shutter.

19. The optical system of claim 18, wherein in the first blocking state, the shutter can block greater than 80% of the light emitted from or reflected by the display that passes through the beam combiner or is incident on the shutter.

20. The optical system of claim 19, wherein in the first blocking state, the shutter can block greater than 90% of the light emitted from or reflected by the display that passes through the beam combiner or is incident on the shutter.

21. The optical system of claim 1, wherein in the first blocking state, the shutter blocks less than 100% of the light emitted from or reflected by the display that passes through the beam combiner or is incident on the shutter.

22. The optical system of claim 21, wherein in the first blocking state, the shutter blocks less than 98% of the light emitted from or reflected by the display that passes through the beam combiner or is incident on the shutter.

23. The optical system of claim 22, wherein in the first blocking state, the shutter blocks less than 95% of the light emitted from or reflected by the display that passes through the beam combiner or is incident on the shutter.

24. The optical system of claim 1, wherein the beam combiner comprises a waveguide.

25. The optical system of claim 1, wherein in the second transmissive shutter state, the shutter has a transmissivity greater than or equal to 70%.

26. A method of reducing light leakage from a display device having a first bright display state when the display device emits light and a second dark display state when the display device emits a reduced amount of light, the method comprising:
   providing a shutter having a first blocking shutter state in which the shutter has a reduced transmissivity when the display device is in the first bright display state and light from the display device is incident on the shutter and a second transmissive shutter state in which the shutter has an increased transmissivity when the display device is in the second dark display state; and
   transitioning the shutter between the first blocking shutter state and the second transmissive shutter state such that said shutter is in the blocking state for a first duration of time between about 1 microsecond and about 100 milliseconds and in the transmissive state for a second duration of time between about 1 microsecond and about 100 milliseconds,
   wherein an unaided human eye can simultaneously perceive objects in a real-world environment and visual information displayed by the display device.

27. The method of claim 26, further comprising providing an electrical signal having a voltage level $V_{blocking}$ that causes the shutter to be in the first blocking shutter state and a voltage level $V_{transmit}$ that causes the shutter to be in the second transmissive shutter state.

28. The method of claim 26, further comprising synchronizing transitioning the shutter between the first blocking shutter state and the second transmissive shutter state with transitioning the display device between the first bright display state and the second dark display state.

29. The method of claim 26, wherein in the first blocking shutter state, the shutter has a transmissivity less than or equal to 30%.

30. The method of claim 26, wherein in the second transmissive shutter state, the shutter has a transmissivity greater than or equal to 70%.

* * * * *